Oct. 21, 1958     C. P. SMITH ET AL     2,857,121

AIRCRAFT

Filed Dec. 6, 1955

INVENTORS
CHARLES PHILIP SMITH
BERNARD JAMES HULLEY
ALASTAIR TARRANT PUGH

By Moses, Nolte, Crews & Berry

ATTORNEYS

2,857,121

AIRCRAFT

Charles Philip Smith, Ramsey, Isle of Man, Bernard James Hulley, Harlow, and Alastair Tarrant Pugh, Bridgnorth, England, assignors to H. M. Hobson Limited, London, England, a British company Application December 6, 1955, Serial No. 551,408

Claims priority, application Great Britain December 7, 1954

4 Claims. (Cl. 244—85)

This invention provides, in an aircraft fitted with power-operated control surfaces or in which the control surfaces are operated by servo tabs, a device for exerting on the pilot's stick a resistance to movement thereof in the direction to move the ailerons which increases progressively with the rate of roll of the aircraft. The feel provided by this system is thus sensitive to roll rates instead of being sensitive to airspeed as is normally the case.

Thus the aircraft may include a pair of bob weights disposed on opposite sides of the axis of roll of the aircraft and arranged to exert on the stick a force opposing movement thereof to actuate the ailerons which varies directly with the square of the rate of roll. Preferably a hydraulic jack which acts as a force intensifier is included in the connection between the bob weights and the stick. This permits of the use of small bob weights disposed at opposite sides of the fuselage but, if preferred, the bob weights may be disposed at the wing tips.

One embodiment of the invention will now be described in detail, by way of example, with reference to the accompanying drawings, in which.

Figure 1:
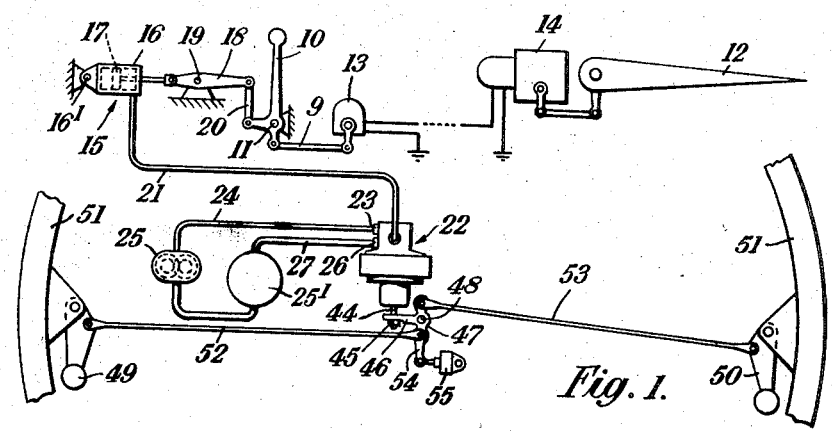
Fig. 1 is a diagrammatic showing of the system.

The pilot's stick 10, which is pivoted at 11, actuates the ailerons, one of which is shown at 12, through the agency of a servo mechanism comprising a transmitter 13 and a pair of remote receivers 14, one associated with each of the ailerons. The stick operates the transmitter through the agency of a link 9 and the receivers operate in conventional fashion, under control of the signals emitted by the transmitter, to move the ailerons in opposite directions as determined by the movement imparted to the stick.

Movement of the stick in the direction to actuate the ailerons is opposed by a hydraulic jack 15, the hydraulic control pressure in which is increased progressively with the rate of roll of the aircraft as later described. The jack comprises a cylinder 16, pivoted on a fixed abutment 16', and a piston 17, the rod of which is coupled by a rocking lever 18, pivoted at 19 to a fixed abutment, and a link 20 to the stick 10. The jack 15 is coupled by a signal line 21 to a control unit 22 which determines the hydraulic control pressure in the jack.

Figure 2:
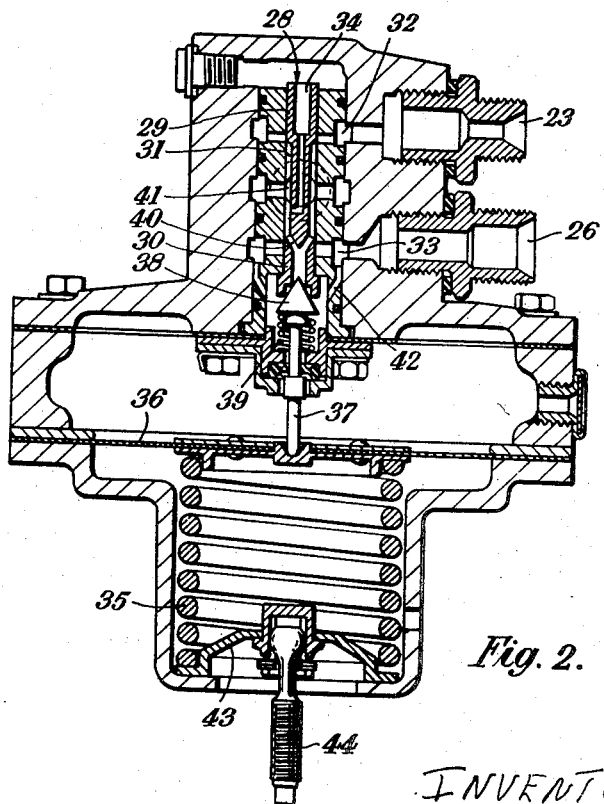
Fig. 2 is an enlarged sectional view through the central unit.

The control unit 22 has an inlet 23, connected to a pressure line 24 supplied with liquid under pressure by a pump 25, and an outlet 26 connected to an exhaust line 27 leading to a reservoir 25' from which the pump draws liquid. As shown in Fig. 2, the control unit contains a piston type control valve 28 which determines the control pressure in the jack and has lands 29, 30 separated by a waisted portion 31 which communicates with an outlet 41 leading to the signal line 21. The lands 29, 30 coact respectively with pressure and exhaust ports 32, 33. The control pressure in the jack acts on the upper end of the control valve 28, as seen in Fig. 2, through the agency of a conduit 34 and the valve is normally held balanced in the neutral position shown by a spring 35, which acts on the lower end of the valve through the agency of a diaphragm 36 and a push rod 37.

The load of the spring 35 is varied, as later described, in accordance with the rate of roll of the aircraft. If the load of the spring 35 increases, the control valve 28 rises, to connect the signal line 21 to the pressure port 32. When the control pressure in the jack has risen to a value balancing the load of the spring, the control valve returns to the neutral position shown. If the load of the spring 35 is reduced, the control valve 28 descends to connect the signal line 21 to the exhaust port 33. When the control pressure in the jack has falln to a value balancing the load of the spring, the control valve returns again to its neutral position. A relief valve 38 is interposed between the push rod 37 and the control valve 28. It is normally held closed by the push rod assisted by a spring 39. The control pressure acts on the relief valve 38 through passages 40 and if the control pressure becomes excessive as the result of seizure of the control valve, the relief valve 38 will open to allow liquid to flow from the jack to the exhaust port 33, through a passage 42.

The abutment for the lower end of the spring 35 is constituted by a plate 43 against which bears a rod 44, having a threaded shank which is screwed into a tapped hole in an arm 46 (Fig. 1) which is retained on the rod 44 by a nut 45. The arm 46 is attached to a lever 47 mounted at 48 for rotation on the axis of roll of the aircraft. Opposed bob weights, 49, 50, mounted at opposite sides of the fuselage 51 act on the ends of the lever 47. The bob weight 49 is connected to the lever 47 below its pivot by a link 52 and the other bob weight 50 is connected by a similar link 53 to the upper end of the lever 47. When the aircraft commences to roll, the bob weights fly outwardly and the lever 47 is rocked clockwise, so raising the arm 46 and increasing the compression of the spring 35 (Fig. 2) so developing in the jack 15 a hydraulic control pressure which is proportional to the square of the rate of roll. As there are two bob weights 49, 50, the response thereof to acceleration in side slip is self-cancelling, and acceleration in side slid does not therefore affect the stick force.

If desired, the lever may, as shown, have an extension 54 beyond the point of connection of one of the links and attached to a damper 55 for stabilising the system.

What we claim as our invention and desire to secure by Letters Patent is:

1. In an aircraft the combination with ailerons, a pilot's control member, and servo means operable by said control member to move said ailerons to positions determined by said control member, of a hydraulic feel simulator comprising a source of hydraulic pressure, a housing, a conduit for passage of liquid to and from said housing to establish a variable hydraulic pressure in the housing, a piston movably mounted in the housing, a linkage operative on movement of the control member from a neutral position to effect relative movement of said piston and housing to expel liquid from the housing through said conduit, a piston-type control valve normally closing said conduit, said control valve being movable in opposite directions from its normal position to connect said conduit to said pressure source and to exhaust thereby respectively increasing and decreasing the hydraulic pressure in said housing, a duct for subjecting one end of said control valve to the hydraulic pressure in the housing, a spring exerting a counterbalancing force on the other end of said control valve, and means operative on rolling of the aircraft to impose on said other end of the control valve a force assisting the spring and increasing with the rate of roll of said aircraft.

2. In an aircraft the combination with ailerons, a pilot's control member, and servo means operable by said control member to move said ailerons to positions determined by said control member, of a hydraulic feel simulator comprising a source of hydraulic pressure, a housing, a conduit for passage of liquid to and from said housing to establish a variable hydraulic pressure in the housing, a piston movably mounted in the housing, a linkage operative on movement of the control member from a neutral position to effect relative movement of said piston and housing to expel liquid from the housing through said conduit, a piston-type control valve normally closing said conduit, said control valve being movable in opposite directions from its normal position to connect said conduit to said pressure source and to exhaust thereby respectively increasing and decreasing the hydraulic pressure in said housing, a duct for subjecting one end of said control valve to the hydraulic pressure in the housing, a movable abutment spaced from the other end of said control valve, a spring mounted in compression between said abutment and said other end of the control valve, a pair of bob-weights disposed on opposite sides of the axis of roll of the aircraft and means controlled by said bob-weights for moving said abutment to increase the compression of said spring progressively with increase in rate of roll of the aircraft.

3. A combination as claimed in claim 2, wherein said bob-weight-controlled means comprise an intermediately pivoted lever connected to said abutment and links connecting points on said lever on opposite sides of its pivot to the bob-weights.

4. A combination as claimed in claim 3, comprising a stabilizing damper connected to said lever.

References Cited in the file of this patent

UNITED STATES PATENTS

| | | |
|---|---|---|
| 2,630,284 | Feeney | Mar. 3, 1953 |
| 2,638,289 | McKellar et al. | May 12, 1953 |
| 2,724,565 | Trevaskis | Nov. 22, 1955 |
| 2,767,942 | Lucien | Oct. 23, 1956 |

FOREIGN PATENTS

| | | |
|---|---|---|
| 479,981 | Canada | Jan. 1, 1952 |